(12) United States Patent
    Gennissen (10) Patent No.: US 9,815,351 B2
(45) Date of Patent: Nov. 14, 2017

(54) WINDOW OR DOOR COVERING ASSEMBLY FOR A VEHICLE

(71) Applicant: Eduardus Leonardus Gennissen, Nieuw Lekkerland (NL)

(72) Inventor: Eduardus Leonardus Gennissen, Nieuw Lekkerland (NL)

( * ) Notice: Subject to any disclaimer, the term of this patent is extended or adjusted under 35 U.S.C. 154(b) by 0 days.

(21) Appl. No.: 14/794,577

(22) Filed: Jul. 8, 2015

(65) Prior Publication Data
    US 2017/0008379 A1    Jan. 12, 2017

(51) Int. Cl.
    *B60J 11/08*     (2006.01)
    *B60J 1/20*      (2006.01)
    *B60J 1/00*      (2006.01)

(52) U.S. Cl.
    CPC ............ *B60J 1/2066* (2013.01); *B60J 1/007* (2013.01); *B60J 11/08* (2013.01); *B60J 1/2088* (2013.01)

(58) Field of Classification Search
    CPC . B60J 1/20; B60J 1/2011; B60J 1/2088; B60J 1/2091; B60J 11/08; B60J 1/007; B60J 1/206; B60J 11/086
    USPC .................... 296/152, 97.1, 97.7, 97.8, 97.11
    See application file for complete search history.

(56) References Cited

U.S. PATENT DOCUMENTS

| 2,496,910 | A | * | 2/1950 | Fridolph | B60J 1/2011 105/396 |
| 4,825,929 | A | * | 5/1989 | Haines | B60J 1/2091 160/107 |
| 5,067,541 | A | * | 11/1991 | Coslett | B60J 1/2091 160/32 |
| 6,318,789 | B1 | * | 11/2001 | Stuart | B60J 1/2019 296/97.4 |
| 2006/0049669 | A1 | * | 3/2006 | Yamamoto | B60J 1/20 296/201 |
| 2006/0082192 | A1 | * | 4/2006 | Dubay | B60J 1/2011 296/214 |
| 2007/0135034 | A1 | * | 6/2007 | Lack | B60J 1/20 454/196 |
| 2008/0017334 | A1 | * | 1/2008 | Mathew | B60J 1/2011 160/370.21 |
| 2008/0148638 | A1 | * | 6/2008 | Knowles | B60J 1/2025 49/70 |
| 2010/0066065 | A1 | * | 3/2010 | Takahashi | B60J 1/2011 280/728.3 |
| 2014/0373475 | A1 | * | 12/2014 | Muskovac | F16B 5/12 52/468 |
| 2017/0008379 | A1 | * | 1/2017 | Gennissen | B60J 1/2066 |

* cited by examiner

*Primary Examiner* — Gregory Blankenship
(74) *Attorney, Agent, or Firm* — Knobbe, Martens, Olson & Bear, LLP (57) ABSTRACT

A combination of a window covering assembly and a window frame can be used in a vehicle. The window frame has an outer face including at least one groove having a depth direction in a direction substantially orthogonal to a pane of the window frame. The window covering assembly is provided with one or more snap elements for snap-fixing the window covering assembly to the at least one groove of the window frame.

32 Claims, 5 Drawing Sheets

WINDOW OR DOOR COVERING ASSEMBLY FOR A VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to the field of door or window covering assemblies for vehicles. More in particular the invention relates to screen assemblies, such as sliding screen assemblies. The invention also relates to the mounting of window covering assembly to a door frame or window frame. The invention also relates to the combination of a door or window frame and a window covering.

Description of the Related Art

Vehicles, such as recreational vehicles, are normally provided with one or more doors and/or one or more windows. Often it is desired to provide the door and/or the window with a window covering. The window covering may e.g. include a screen, such as an insect screen. Alternatively, or additionally, the window covering can include a shade.

Conventionally, the window covering is mounted to the wall surrounding a door frame/window frame, or to the door frame/window frame itself. Such mounting normally includes screwing the window covering to the wall or the frame. Mounting the window covering this way can be very time-consuming. Moreover, often the mounting includes mounting additional trim rings for covering any gap between the window covering and the wall and/or frame.

A specific combination of a door frame and a door covering is known which is designed to reduce mounting time. The door frame has an outer face including a groove having a depth direction in a direction substantially orthogonal to a plane of the door. The door covering is provided with a plurality of straight lugs having corrugated surfaces. The lugs insert into the groove of the door frame to hold the window covering in place by friction. Since the connection between the door covering and the door frame is based on friction, the window covering can easily be removed from the door frame. The lugs holding the door covering in place by friction of the corrugated surfaces, the lugs can be inserted into the groove at a variable depth. This provides the advantage that the insertion depth can be chosen in dependence of the thickness of the wall at hand. A disadvantage is that it is not easily verifiable whether the lug is inserted into the groove sufficiently deep to provide a rugged connection, able to withstand forces, e.g. during movement of the recreational vehicle.

SUMMARY OF THE INVENTION

The invention relates to a combination of a window covering assembly and a window frame of a vehicle. The invention also relates to a door covering assembly and a door frame of a vehicle.

An object of the invention is to provide a combination of a door or window covering and a door or window frame which can easily be assembled. Another object is to provide a combination which can accommodate a large variety of wall thicknesses. Another object is to provide a combination in which the covering is mounted to the frame with a defined strength. Another object of the invention is to provide an improved combination of a door or window frame and a door or window covering. Another object of the invention is to provide an alternative combination of a door or window frame and a door or window covering.

Thereto according to the invention is provided a combination of a window covering assembly and a window frame of a vehicle. The window frame has an outer face including at least one groove having a depth direction in a direction substantially orthogonal to a pane of the window frame. The window covering assembly is provided with one or more snap elements for snap-fixing the window covering assembly to the at least one groove of the window frame.

The groove having a depth direction in a direction substantially orthogonal to a pane of the window frame provides the advantage that the window covering assembly can be snap-fixed to the window frame in a direction substantially orthogonal to the pane. This makes attaching of the window covering assembly to the window frame extremely simple. The use of a snap element provides certainty that the window covering assembly is attached properly to the window frame: once the snap element snaps into place, the connection is proper.

The at least one snap element and/or the groove can be provided with a retainer, such as one or more barbs, ridges, or the like, for retaining the snap element in the groove. This helps preventing the window covering assembly from becoming dislodged from the window frame.

The outer face of the window frame can extend substantially parallel to the pane of the window frame. Other designs are possible however. The at least one groove extends in its depth direction in the direction substantially orthogonal to a pane of the window frame also in cases where the outer face does not extend substantially parallel to the pane of the window frame.

Optionally, the window frame includes first frame members of extruded profiles. The extruded profiles can e.g. be of aluminum or plastics. The at least one groove can be an extruded groove in at least one of the first frame members. Thus the window frame, including the at least one groove, can be manufactured of extruded profiles at low cost.

Optionally, the one or more snap elements are lugs of the window covering assembly cooperating with the at least one groove of the window frame.

Optionally, the at least one groove includes an undercut portion. The undercut portion makes that the at least one groove is narrower at the outer face of the window frame than at a deeper portion of the groove. Hence, the snap element can easily be prevented from escaping the groove. The undercut may have a surface for retaining the snap element extending substantially orthogonal to the depth direction of the groove. The undercut may have a surface for retaining the snap element extending substantially at an acute angle to the depth direction of the groove. The one or more snap elements may include a retainer projecting laterally from the snap element into the undercut portion. This allows the snap element to remain strongly fixated in the groove once snapped. Thus, un-snapping of the snap element from the at least one groove may be prevented.

Optionally, the one or more snap elements include a support surface for abutting against the window frame. This provides the advantage that forces exerted onto the window frame or onto the window covering assembly can be transmitted more efficiently, reducing the risk of material failure of the snap element. Thus, the combination can be made stronger while retaining the advantage of the snap elements.

Optionally, the retainer and the support surface are positioned and/or dimensioned for applying substantially oppositely directed forces onto the window frame. This provides the advantage that the connection between the snap element and the window frame has no play. Any potential play is counteracted by the opposed forces.

The window frame can be proved with a flange arranged to abut against an outer surface of the wall in which the window frame is to be mounted. Optionally, the window frame includes one or more mounting brackets. The mounting brackets are arranged to abut against an opposite side of the wall. Thus, the wall can be clamped between the flange and the mounting brackets. The mounting bracket can be inserted into the at least one groove. Alternatively, or additionally, the mounting brackets can be secured in the at least one groove, e.g. by a screw or bolt. The use of mounting brackets provides the advantage that the window frame can easily be mounted to the wall. It will be appreciated that the mounting brackets can be covered by the window covering assembly. Hence, a separate trim ring for the window frame is not required. This provides a cost saving relative to known systems which rely on mounting the window frame using a trim ring. Moreover, the (often metal) conventional trim ring and its attachment to the window frame often forms a thermal bridge, causing impaired thermal isolation between the inside and the outside of the window, and risk of condensation of water on the trim ring. The connection using the snap element according to the invention, however, provides improved thermal isolation.

Optionally, the window covering assembly includes an assembly frame. The window covering assembly can include a movable beam, movable with respect to the assembly frame, e.g. in a substantially vertical direction. The window covering assembly can include a screen and/or shade connected to the movable beam, so as to be moved between an open and a closed position. The assembly frame can be provided with said one or more snap elements for snap-fixing the window covering assembly to the window frame. The screen and/or shade can be pleated, so as to be compacted by folding when being opened. It is also possible that the screen and/or shade is wound up on a roll for compacting the screen and/or shade. Optionally, the window covering assembly frame includes second frame members of extruded profiles. The extruded profiles can e.g. be of aluminum or plastics. At least one of the second frame members can include an extruded second groove.

Optionally, the combination includes at least one separate snap element including at least one first lug for snapping connection to the first groove and at least one second lug for snapping connection to the second groove. The separate snap element provides the advantage that the window frame and the assembly frame can be made substantially without projections. Hence, manufacturing of the window frame and the assembly frame can be cheaper and easier. The separate snap element can e.g. be an injection-moulded part. The separate snap element can e.g. be of plastics material.

Optionally, the separate snap element is chosen from a plurality of separate snap elements having different lengths. The different lengths can correspond to a plurality of different wall thicknesses. Hence, it is very easy to provide the combination of the window frame and the window covering assembly that can fit to virtually any wall thickness. It will be appreciated that in this case the window frame needs no specific adaptation to the wall thickness. Possibly the mounting bracket of the window frame can be chosen from a plurality of mounting brackets having different lengths. The different lengths can correspond to a plurality of different wall thicknesses. It will be appreciated that the window covering assembly needs no specific adaptation to the wall thickness, besides the choosing of the appropriate separate snap element.

Optionally, the at least one second groove includes at least one undercut portion. Optionally, the at least one second lug of the separate snap element includes a retainer projecting laterally from the second lug into the undercut portion. As explained above in view of the first lug interacting with the at least one groove of the window frame, this can prevent un-snapping of the snap element from the second groove.

Optionally, the at least one second lug includes a support surface for abutting against the assembly frame. This provides the advantage that forces exerted onto the window frame or onto the window covering assembly can be transmitted more efficiently, reducing the risk of material failure of the snap element. Thus, the combination can be made stronger while retaining the advantage of the separate snap elements.

Optionally, the retainer and the support surface are positioned and/or dimensioned for applying substantially oppositely directed forces onto the assembly frame. This provides the advantage that the connection between the snap element and the assembly frame has no play. Any potential play is counteracted by the opposed forces.

Optionally, the second frame member includes an area free of grooves adjacent the second groove, wherein the area free of grooves has a width that is larger than the second lug, preferably more than two times larger, more preferably more than three times larger. This provides the advantage that the separate snap element can easily be inserted into the at least one second groove. Any misplacement of the separate snap element will result in the snap element abutting the area free of grooves, which can easily be seen and/or felt during assembly.

Optionally, the separate snap element includes one first lug and two second lugs. This provides a three-point connection of the separate snap element to the window frame and the assembly frame. Hence, the connection is very rigid. Optionally, the two second lugs are laterally spaced apart. The larger the spacing, the larger the rigidity can be.

Optionally, the window frame and the assembly frame are free from direct contact. The only contact between the window frame and the assembly frame may be the separate snap elements, and possibly one or more trim plates. The window frame and the assembly frame can be only attached to each other via the at least one separate snap element. No other fixing means may be required.

Optionally, one or more of the snap elements is arranged for allowing the at least one first lug to deviate relative to the at least one second lug. This provides the advantage that a misalignment or dimensional tolerance between the window frame and the assembly frame can be accommodated. Optionally, the combination includes some snap elements arranged for allowing deviation, and one or more snap elements not allowing deviation. Hence, the position of the assembly frame relative to the window frame can be fixed, while still misalignment or dimensional tolerances can be accommodated.

Optionally, the window frame includes four first frame members of extruded profiles forming a substantially rectangular frame; wherein the window covering assembly frame includes four second frame members of extruded profiles forming a substantially rectangular frame; wherein the snap members mutually connect at least two first frame members with at least two second frame members.

Optionally, the window frame and the window covering frame are substantially rectangular. However, it is also possible that one or more of the first and/or second frame members is slanted. It is also possible that one or more of the first and/or second frame members is curved. Optionally, the window frame includes a first frame member that is bent to form a corner of the window frame. Optionally the window frame includes a single first frame member bent to form the whole, or substantially the whole, perimeter of the window frame. Optionally at least one corner of the window frame is rounded. Optionally, the window covering assembly frame includes a second frame member that is bent to form a corner of the window covering assembly frame. Optionally the window covering assembly frame includes a single second frame member bent to form the whole, or substantially the whole, perimeter of the window covering assembly frame. Optionally at least one corner of the window covering assembly frame is rounded.

Optionally, one or more of the snap elements is positioned at the rounded corned of the window frame and the rounded corner of the window covering assembly frame. Preferably at least one snap element is positioned at each rounded corner of the window covering assembly frame. This provides the advantage that the window covering assembly with the rounded corner can easily be aligned with the window frame with the rounded corner. Positioning the snap element at the rounded part of the corner accurately aligns the corners of the window frame and the window covering assembly frame. It will be appreciated that the at least one groove provides the advantage of attaching the snap element at the rounded part of the corner is made simple.

The invention also relates to a covering assembly for a door frame or window frame of a vehicle. The covering assembly includes an assembly frame. The covering assembly includes a movable beam, movable with respect to the assembly frame. The covering assembly includes a screen and/or shade connected to the movable beam, so as to be moved between an open and a closed position. The assembly frame is provided with one or more snap elements extending in a direction that is substantially orthogonal to a direction in which the screen and/or shade extends in its closed position for snap-fixing the covering assembly to the door frame or window frame. It will be appreciated that the covering assembly can be used as the window covering assembly of the combination as described above.

Optionally, the assembly frame includes two opposed guides for guiding the movable beam. The opposed guides allow for simple, e.g. sliding, movement of the movable beam. The movable beam may include runners, e.g. injection moulded glide parts, arranged to by guided by the opposed guides. The covering assembly may include cords. The cords may extend through the movable beam in a so-called H-configuration. In the H-configuration a first cord extend from the top left corner of the screen assembly to the left of the movable beam, through the movable beam to the right of the movable beam, and from the right of the movable beam to the lower right corner of the screen assembly. In the H-configuration a second cord extend from the bottom left corner of the screen assembly to the left of the movable beam, through the movable beam to the right of the movable beam, and from the right of the movable beam to the upper right corner of the screen assembly. The cords in the H-configuration aid in maintaining the movable beam aligned in a vertical direction.

Optionally the screen and/or shade is pleated. Folds of the pleated screen and/or shade can be substantially horizontal. It is also possible that the screen and/or shade is wound up on a roll.

Optionally the screen and/or shade is fire retardant or fire resistant.

Optionally, the covering assembly includes a both a screen and a shade. The shade can be attached to the movable beam on the side opposite to the side where the screen is attached. Then, when the movable beam is moved completely to one side, the window opening is covered by the screen, and when the movable beam is completely moved to the other side the window opening is covered by the shade. It is also possible that the screen and the shade each are associated with a dedicated movable beam. It is also possible that the covering assembly includes two screens or two shades.

Optionally, the one or more snap elements of the screen assembly are lugs of the screen assembly arranged for cooperating with a groove of the door frame or window frame.

Optionally, the one or more snap elements include a retainer projecting laterally from the snap element. The retainer can be arranged for cooperating with an undercut portion of the groove of the door frame or the window frame, for preventing un-snapping of the snap element from said groove.

Optionally, the one or more snap elements include a support surface for abutting against the door frame or window frame.

Optionally, the retainer and the support surface are positioned and/or dimensioned for applying substantially oppositely directed forces onto the door frame or window frame.

Optionally, the covering assembly frame includes second frame members of extruded profiles; wherein at least one second frame members includes an extruded second groove.

Optionally, the covering assembly includes at least one separate snap element including at least one second lug for snapping connection to the second groove at least one first lug for snapping connection to the groove of the door frame or window frame.

Optionally, the at least one second groove includes at least one undercut portion.

Optionally, the at least one second lug includes a retainer projecting laterally from the second lug into the undercut portion. The retainer projecting into the undercut portion can help preventing un-snapping of the snap element from the second groove.

Optionally, the at least one second lug includes a support surface for abutting against the assembly frame.

Optionally, the retainer and the support surface are positioned and/or dimensioned for applying substantially oppositely directed forces onto the assembly frame.

Optionally, the second frame member includes an area free of grooves adjacent the second groove, wherein the area free of grooves has a width that is larger than the second lug, preferably more than two times larger, more preferably more than three times larger.

Optionally, the separate snap element includes one first lug and two second lugs.

Optionally, the two second lugs are laterally spaced apart.

Optionally, the door frame or window frame and the assembly frame are free from direct contact. Optionally, the door frame or window frame and the assembly frame are only attached to each other via the at least one separate snap element.

Optionally, the covering assembly includes four second frame members of extruded profiles forming a substantially rectangular frame. The snap members mutually connect at least two second frame members with the door frame or window frame.

The invention also relates to a method for connecting a window covering assembly to a window frame of a vehicle. The method includes providing a window frame having an outer face, the outer face including at least one groove having a depth direction in a direction substantially orthogonal to a pane of the window frame. The method includes providing a window covering assembly provided with one or more snap elements for snap-fixing the window covering assembly to the at least one groove of the window frame. The method includes snap-fixing the window covering assembly to the window frame by pressing the one or more snap elements into the at least one groove in a direction substantially orthogonal to a pane of the window frame.

BRIEF DESCRIPTION OF THE DRAWINGS

Embodiments of the present invention will now be described in detail with reference to the accompanying drawings in which.

DETAILED DESCRIPTION OF THE PREFERRED EMBODIMENT

Figure 1:
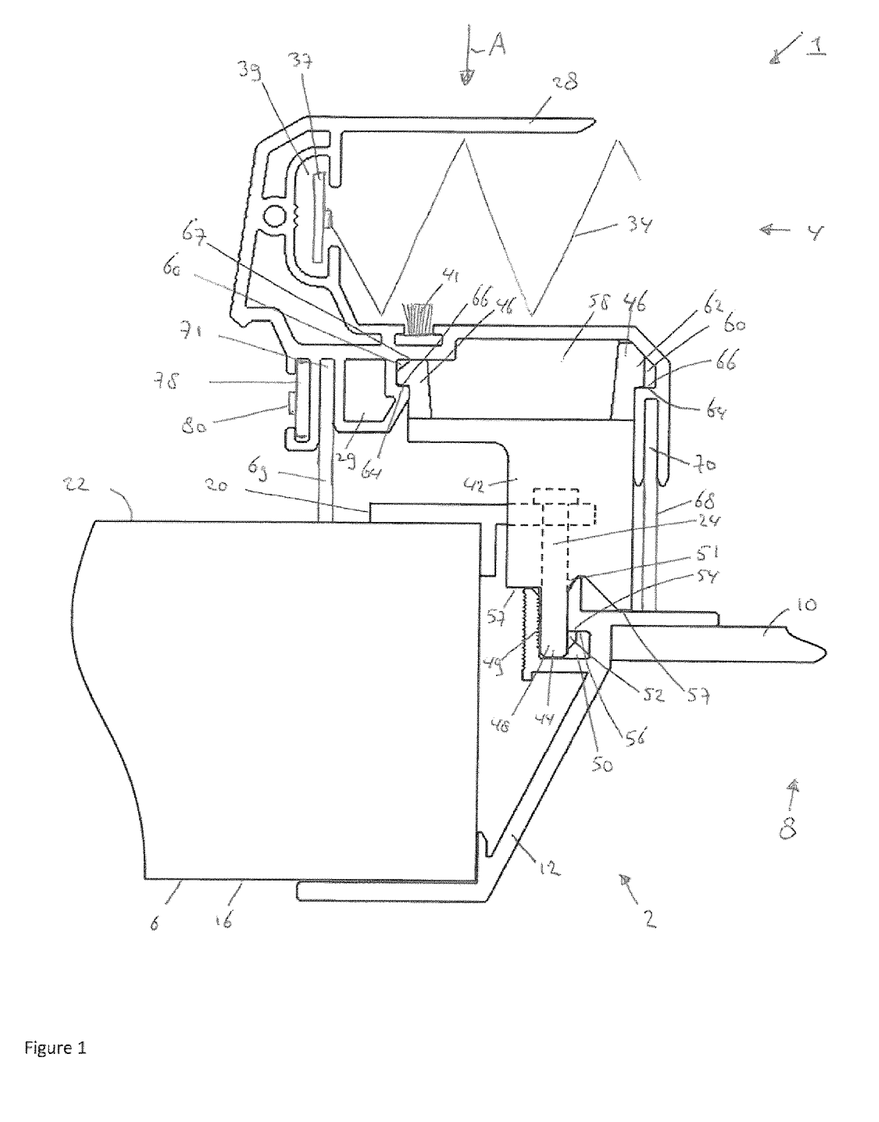
FIG. 1 is a schematic representation of a cross section of a combination of a window frame and a window covering assembly.

FIG. 1 shows a schematic representation of a cross section of an example of a combination 1 of a window frame 2 and a window covering assembly 4 according to the invention. The combination 1 in FIG. 1 is mounted to a wall 6. The wall 6 has an opening 8 in which the window pane 10 extends. The window pane 10 is mounted in the window frame 2. It will be appreciated that the window frame 2 may be provided with a structure for allowing the window to be opened.

In this example, the window frame 2 includes a first frame member 12 of an extruded profile, e.g. of plastics or aluminum. The first frame member 12 has a flange 14 that abuts against a first side 16 of the wall 6. In this example, the first side 16 is the outer side of the wall, e.g. the outside of a recreational vehicle. In FIG. 1 the window frame 2 further includes a mounting bracket 18. The mounting bracket 18 has a flange 20 that abuts against a second side 22 of the wall 6. Here the second side 22 is opposite the first side 16. In this example the mounting bracket 18 is mounted to the first frame member 12 using a screw 24.

Figure 2A:
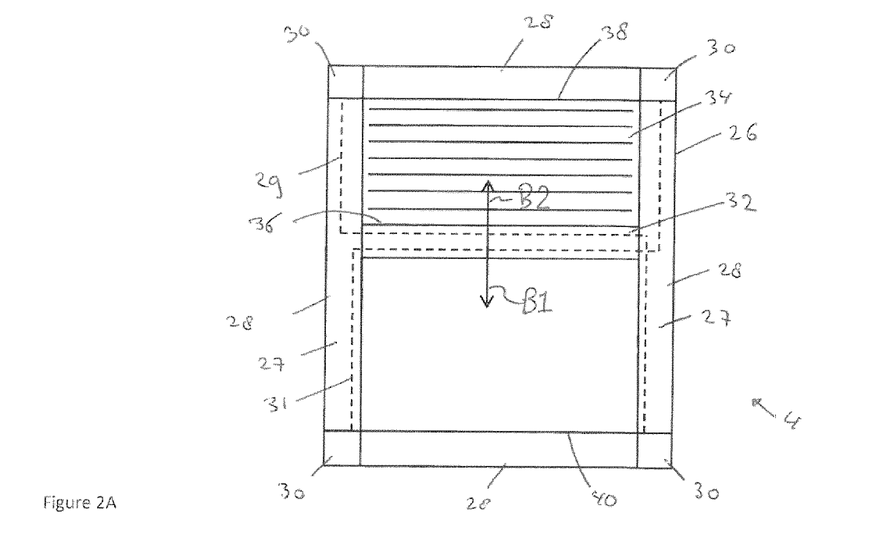
FIG. 2A is a schematic representation of a window covering assembly.

FIG. 2A shows an example of a window covering assembly 4. In FIG. 2A the window covering assembly is shown as viewed in the direction of arrow A in FIG. 1. In this example the window covering assembly 4 includes an assembly frame 26. Here the assembly frame 26 includes four second frame members 28. The second frame members 28 are extruded profiles, e.g. of plastics or aluminum. In this example the second frame members 28 are mutually connected via corner pieces 30. The window covering assembly 4 further includes a movable beam 32. The movable beam is movable with respect to the assembly frame 26. In this example the left and right second frame members act as guides for guiding movement of the movable beam 32 in the direction of arrows B1 and B2. The window covering assembly 4 further includes a screen 34. The screen 34 is connected to the movable beam at a first side 36 thereof. The screen is connected to the assembly frame 26 at a first side 38 thereof. In this example the screen 34 includes a mounting strip 37 that is inserted into a mounting groove 39 of the second frame member 28. When the movable beam 32 is moved in the direction of arrow B1 the screen 34 is extended over the window opening. Thus, the screen closes off the window opening. When the movable beam 32 is positioned adjacent a second side 40 of the assembly frame 26 the window opening is fully closed by the screen 34, and the movable beam is said to be in the closed position. When the movable beam 32 is moved in the direction of arrow B2 the screen 34 is compacted. In this example the screen 34 is pleated, so as to be compacted by folding. It is also possible that the screen is wound up on a roll for compacting the screen. When the movable beam 32 is positioned adjacent the first side 38 of the assembly frame 26 the window opening is fully released by the screen 34, and the movable beam is said to be in the open position. In this example the window covering assembly 4 includes a brush strip 41. The brush strip 41 presses against the screen 34 when compacted for preventing movement of the screen 34. This helps prevent rattling of the screen.

In this example the window covering assembly 4 includes two opposed guides 27 for guiding the movable beam 32. The opposed guides 27 allow for sliding movement of the movable beam 32. In this example the window covering assembly 4 also includes cords. The cords extend through the movable beam 32 in a so-called H-configuration. A first cord 29 extends from the top left corner of the window covering assembly 4 to the left of the movable beam 32, through the movable beam to the right of the movable beam, and from the right of the movable beam 32 to the lower right corner of the window covering assembly 4. A second cord 31 extends from the bottom left corner of the window covering assembly 4 to the left of the movable beam 32, through the movable beam to the right of the movable beam, and from the right of the movable beam 32 to the upper right corner of the window covering assembly 4. The cords 29, 31 in the H-configuration aid in maintaining the movable beam 32 aligned orthogonal to the opposed guides 27.

Figure 2B:
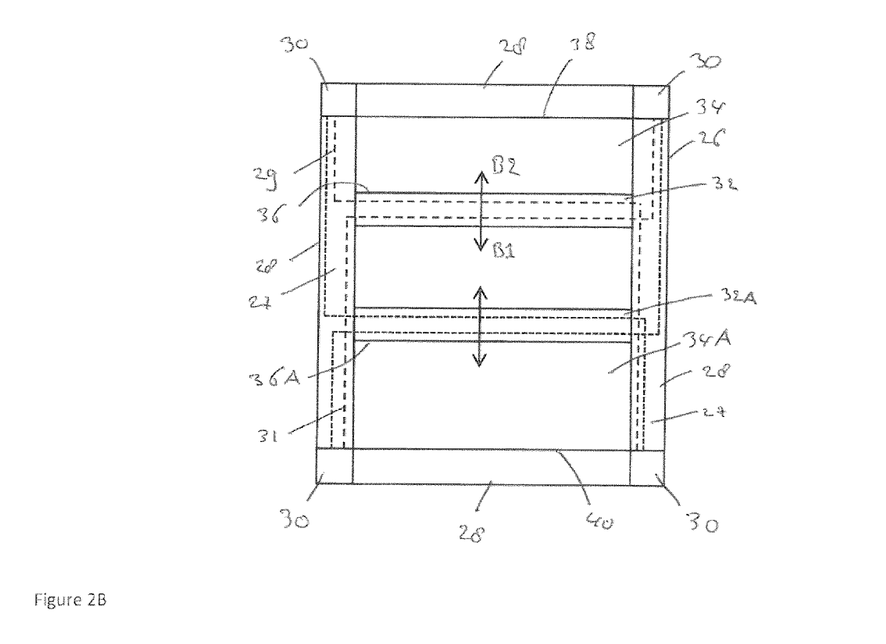
FIG. 2B is a schematic representation of a window covering assembly.

It will be appreciated that the window covering assembly 4 may also include a second movable beam 32A as shown in FIG. 2B. The second movable beam, may e.g. be connected to a shade 34A at a second side 36A of the second movable beam 32A. The shade 34A may be connected to the assembly frame 26 at a second side 40 thereof. The second movable beam may also have associated cords in a H-configuration. When the second movable beam 32A is moved in the direction of arrow B1A the shade 34A is compacted. In this example the shade 34A is pleated, so as to be compacted by folding. It is also possible that the shade is wound up on a roll for compacting the shade. When the second movable beam 32A is positioned adjacent the second side 40 of the assembly frame 26 the window opening is fully released by the shade 34A, and the second movable beam is said to be in the open position. It will be appreciated that using both the movable beam 32 and the second movable beam 32A any combination of the window being (partly) uncovered, (partly) covered by the screen 34 and/or (partly) covered by the shade 34A can be obtained.

Turning again to FIG. 1, the second frame member 28 of the window covering assembly 4 is also shown. In FIG. 1 the window covering assembly 4 is attached to the window frame 2 by means of a snap element 42. In this example the snap element 42 is a separate element. The snap element 42 may e.g. be an injection moulded part, e.g. of a plastics material.

The snap element 42 in FIG. 1 has a first lug 44 engaging with the window frame 2. The snap element in FIG. 1 has two second lugs 46 engaging with the window covering assembly 4.

The window frame 2, here the first frame member 12, has a first groove 48. The first groove 48 has a depth direction in a direction substantially orthogonal to the plane of the window pane 10. It will be appreciated that it is also possible that the first groove 48 has a depth direction in a direction substantially orthogonal to the plane in which the wall 6 extends. Normally the window pane 10 and the wall 6 will extend in parallel planes. In the example the first groove 48 is an extruded groove in the extruded profile forming the first frame member 12. The first groove 48 includes an undercut portion 50. The first lug 44 of the snap element 42 has a projection 52 engaging with the undercut portion 50. The projection 52 and the undercut portion 50 ensure a proper snap fit of the snap element 42 in the first groove 48. Unintentional removal of the snap element may thereby be prevented. In this example, the undercut portion has a retaining surface 54 extending substantially orthogonal to the depth direction of the first groove 48. Also the projection 52 has a retaining surface 56 extending substantially orthogonal to the direction in which the first lug 44 extends i.e. substantially orthogonal to the depth direction of the first groove 48. The retaining surfaces 54, 56 ensure a high force barrier against removal of the snap element 42 from the first groove 48.

In this example the first groove 48 has one surface provided with longitudinally extending ridges 49. These ridges are preferably dimensioned not to interfere with positioning accuracy provided by the interaction between the projection 52 and the undercut portion 50. The longitudinal ridges 49 provide a serrated surface that the screw 24 securing the mounting bracket 18 to the first frame member 12 can grip to.

The window covering assembly 4, here the second frame member 28, has a second groove 58. The second groove 58 has a depth direction in a direction substantially orthogonal to the plane of the window pane 10. It will be appreciated that it is also possible that the second groove 58 has a depth direction in a direction substantially orthogonal to the plane in which the window covering extends. Normally the window pane 10 and the window covering will extend in parallel planes. In the example the second groove 58 is an extruded groove in the extruded profile forming the second frame member 28. In this example the second groove 58 is much wider than the first groove 48. The second groove 58 has a width that is preferably more than two times, more preferably more than four times, even more preferably more than eight times the width of the first groove 48. This allows the second groove 58 to be engaged by two second lugs 46 of the snap element 42. Said two second lugs 46 are laterally spaced apart, i.e. in a direction orthogonal to the longitudinal direction of the second groove 58. Thus, the snap element 42 engages the first and second frame members 12, 28 at three point when viewed in the lateral cross section of FIG. 1. This three-point connection makes for a very stiff and dimensionally stable connection between the window covering assembly 4 and the window frame 2.

The second groove 58 includes undercut portions 60. The second lugs 46 of the snap element 42 each have a projection 62 engaging with the respective undercut portion 60. The projections 62 and the undercut portions 60 ensure a proper snap fit of the snap element 42 in the second groove 58. Unintentional removal of the snap element may thereby be prevented. In this example, the undercut portions each have a retaining surface 64 extending substantially orthogonal to the depth direction of the second groove 58. Also the projections 62 each have a retaining surface 66 extending substantially orthogonal to the direction in which the second lugs 46 extend i.e. substantially orthogonal to the depth direction of the second groove 58. The retaining surfaces 64, 66 ensure a high force barrier against removal of the snap element 42 from the second groove 58. In this example the second frame member 28 includes a hollow extrusion portion 29. The hollow extrusion portion 29 provides extra stiffness to the undercut portion 60.

In this example the snap element 42 includes a first support surface 57 for abutting against the first frame member 12. This provides the advantage that forces exerted onto the window frame 2 or onto the window covering assembly 4 can be transmitted more efficiently, reducing the risk of material failure of the snap element 42. Here, the projection 52 and the first support surface 57 are positioned and dimensioned for applying substantially oppositely directed forces onto the first frame member 12. This provides the advantage that the connection between the snap element 42 and the first frame member 12 has no play. Any potential play is counteracted by the opposed forces.

In this example the snap element 42 includes a second support surface 67 for abutting against the second frame member 28. This provides the advantage that forces exerted onto the window frame 2 or onto the window covering assembly 4 can be transmitted more efficiently, reducing the risk of material failure of the snap element 42. Here, the projection 62 and the second support surface 67 are positioned and dimensioned for applying substantially oppositely directed forces onto the second frame member 28. This provides the advantage that the connection between the snap element 42 and the second frame member 28 has no play. Any potential play is counteracted by the opposed forces.

For assembling the window covering assembly 4 to the window frame 2, a plurality of snap elements 42 may be snap fitted to the window covering assembly 4. Next, the window covering assembly 4 with the snap elements can be snap fitted to the window frame 2 by inserting the first lugs 44 into the first grooves 48. This snap-fitting can be done in a direction substantially orthogonal to the plane in which the window pane extends. This provides the advantage that snap-fitting the window covering assembly 4 to the window frame 2 is very intuitive and alignment is very easy. As can be seen in FIG. 1, the first groove 48 is provided with a tapered entrance area 51. The tapered entrance area 51 aids in inserting the first lugs 44 into the first groove 48, especially since a view of the first groove 48 may be, at least partially, obstructed when snapping the window covering assembly 4 onto the window frame 2.

Figure 3:
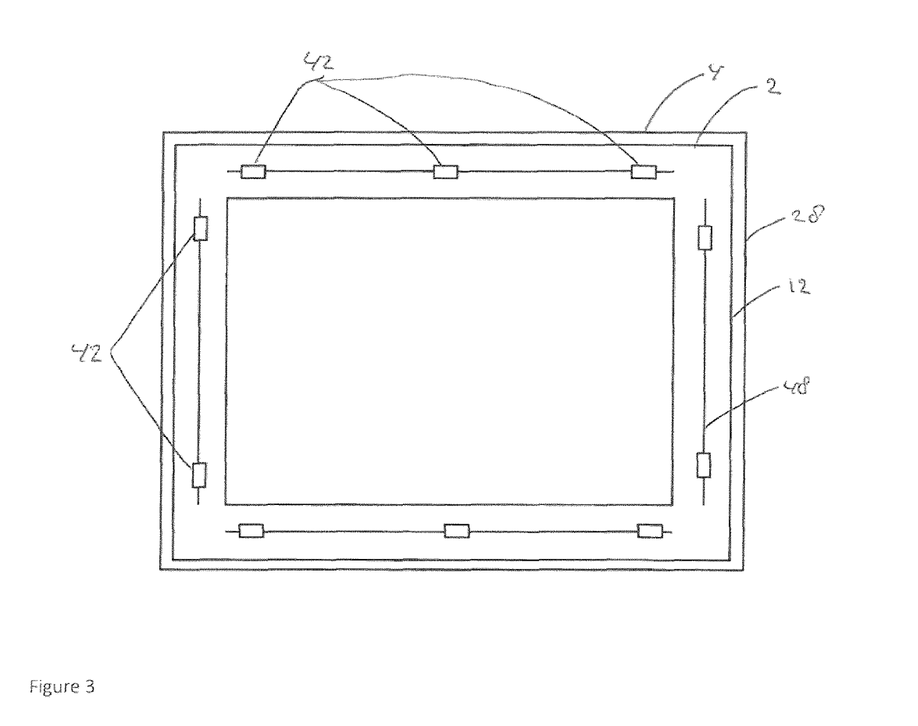
FIG. 3 shows a schematic view of a window covering assembly attached to a window frame.

FIG. 3 shows a schematic view of a window covering assembly 4 attached to a window frame 2. In this example the upper second groove 58 is connected to the upper first groove 48 by means of three snap elements 42. In this example the lower second groove 58 is connected to the lower first groove 48 by means of three snap elements 42. In this example the left second groove 58 is connected to the left first groove 48 by means of two snap elements 42. In this example the right second groove 58 is connected to the right first groove 48 by means of two snap elements 42. It will be appreciated that different numbers of snap elements 42 may be used, e.g. depending on dimensions of the window covering assembly 4. It is possible that not each first frame member 12 is connected to a second frame member 28.

Figure 4A:
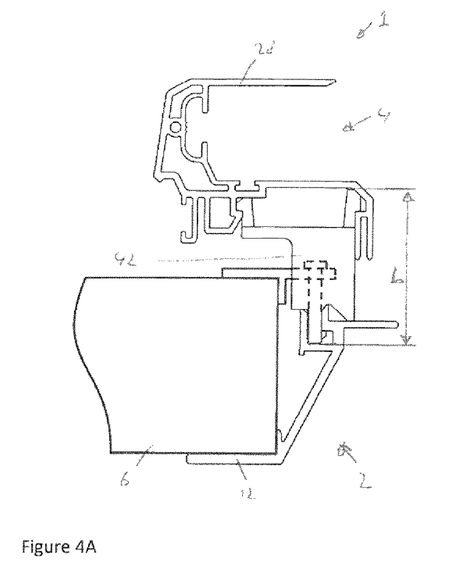
FIGS. 4A and 4B show schematic cross sectional views of a combination of a window frame and a window covering assembly.
Figure 4B:
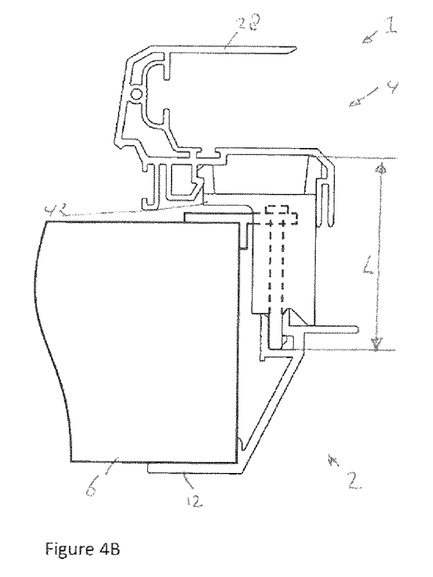

FIGS. 4A and 4B show schematic cross sectional views demonstrating an example of adaption of the system to different wall thicknesses. In FIG. 4A the wall 6 has a first thickness and the length L of the snap element 42 is chosen according to the first wall thickness. In FIG. 4B the wall 6 has a second thickness and the length L of the snap element 42 is chosen according to the second wall thickness. It will be appreciated that a mounting kit for mounting the window covering assembly 4 to the window frame 2 may include a first plurality of snap elements 42 of a first length and a second plurality of snap elements 42 of a second length, so as to allow a user to select the snap elements 42 appropriate for the wall thickness at hand. It will be appreciated that it is also possible that more than two different lengths are provided.

Figure 5:
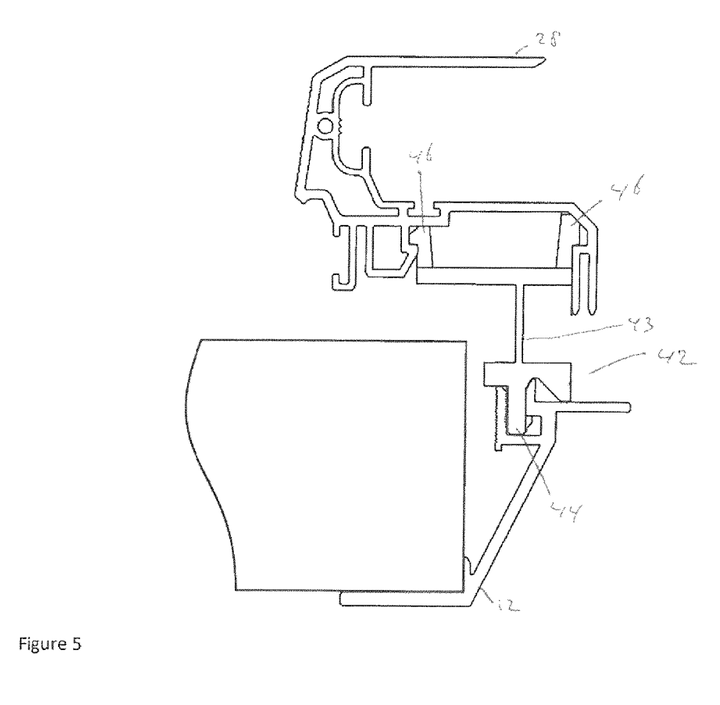
FIG. 5 shows a schematic cross sectional view of a combination of a window frame and a window covering assembly.

FIG. 5 shows a schematic cross sectional view wherein an alternative snap element 42A is shown. The alternative snap element 42 is arranged to be flexible in the lateral direction. Here the alternative snap element has a flexible lip 43, acting as a leaf spring. Hence, the first lug 44 can move laterally relative to the second lugs 46. Since the flexible lip acts as a leaf spring, stiffness in the longitudinal direction is not compromised. Advantageously, the window covering assembly 4 is attached to the window frame 2 using one or more snap elements 42, which accurately define positioning of the window covering assembly 4 relative to the window frame, and using one or more alternative snap elements 42A, which allow to accommodate dimensional tolerances or misalignment of first frame members relative to second frame members.

Figure 6:
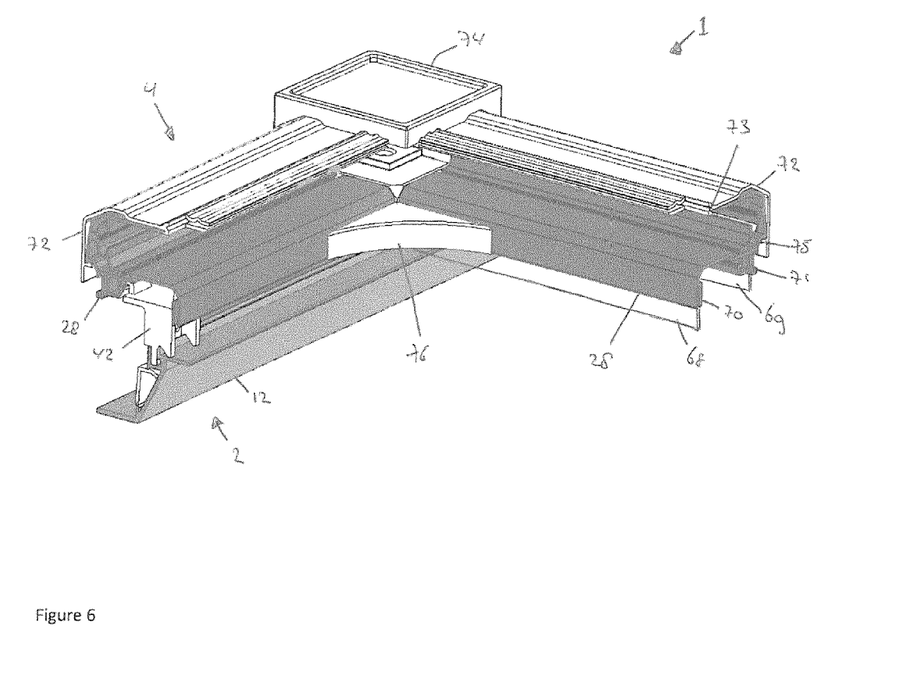
FIG. 6 shows a schematic cross sectional view of a combination of a window frame and a window covering assembly.

FIG. 6 shows a schematic cross sectional view of a combination of a window covering assembly 4 and a window frame 2. The combination is similar to the combination shown in FIG. 1. In the example of FIG. 6 the window covering assembly 4 further includes a first trim plate 68 for covering the gap between the window covering assembly 4 and the window frame 2 on the inner perimeter. The first trim plate 68 inserts into a further groove 70 of the second frame member 28. In the example of FIG. 6 the window covering assembly 4 further includes a second trim plate 69 for covering the gap between the window covering assembly 4 and the wall 6 on the outer perimeter. The second trim plate 69 inserts into a further groove 71 of the second frame member 28. In FIG. 6 the window covering assembly further includes an outer cover 72. The outer cover 72 can be a decorative cover covering the first frame member 28. In this example the outer cover has a hook portion 73 and a retaining portion 75 for snap-fitting the outer cover 72 to the second frame member 28. In FIG. 6 the window covering assembly further includes an outer corner cover 74. The outer corner cover 74 can be a decorative cover covering the corner piece 30. In this example, the window covering assembly 4 further includes a roundover insert 76 at the corner.

Returning to FIG. 1, in this example the window covering assembly 4 includes a lighting unit 78. In this example the lighting unit is arranged as a plate with light emitting diodes (LEDs) 80 mounted on a surface thereof. The lighting unit 78 here is arranged to transmit light in a main direction substantially parallel to the wall. This provides indirect illumination of a room including the window, which often is experienced as pleasing. Direct view of the LEDs 80 can be obstructed by the outer cover 72.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the window frame and the window covering frame are substantially rectangular. However, it is also possible that one or more of the first and/or second frame members is slanted. It is also possible that one or more of the first and/or second frame members is curved.

In the example of FIG. 2B two movable beams are used. It is also possible that a single movable beam is used having the screen attached to a first side thereof and the shade attached to a second side thereof. Further, in the examples of FIGS. 2A and 2B the window covering assembly includes a screen and a shade. It is also possible that the window covering assembly includes two screens or two shades. The two screens can e.g. have a different mesh size, transparency, translucency, color, pattern or texture. The two shades can e.g. have a different transparency, translucency, color, pattern or texture.

In the examples the movable beam is arranged for movement in vertical direction. It will be appreciated that it is also possible that the movable beam is arranged for movement in other directions, such as horizontal direction.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. A combination of a window covering assembly and a window frame of a vehicle,
   the window frame having an outer face including at least one groove having a depth direction in a direction substantially orthogonal to a pane of the window frame;
   wherein the window covering assembly includes:

an assembly frame;
a movable beam, movable with respect to the assembly frame;
a screen and/or shade connected to the movable beam, so as to be moved between an open and a closed position;
wherein the assembly frame is provided with one or more snap elements for snap-fixing the window covering assembly to the at least one groove of the window frame.

2. The combination of claim 1, wherein the window frame includes first frame members of extruded profiles; wherein the at least one groove is an extruded groove in at least one of the first frame members.

3. The combination of claim 1, wherein the one or more snap elements are lugs of the window covering assembly cooperating with the at least one groove of the window frame.

4. The combination of claim 1, wherein the at least one groove includes an undercut portion, and wherein the one or more snap elements include a retainer projecting laterally from the snap element into the undercut portion.

5. The combination of claim 4, wherein the one or more snap elements include a support surface for abutting against the window frame, and wherein the retainer and the support surface are positioned and/or dimensioned for applying substantially oppositely directed forces onto the window frame.

6. The combination of claim 1, wherein the window frame includes one or more mounting brackets, wherein the mounting bracket is inserted into or secured in the at least one groove.

7. The combination of claim 1, wherein the window covering assembly frame includes a second groove, wherein the combination includes at least one separate snap element including at least one first lug for snapping connection to the first groove and at least one second lug for snapping connection to the second groove.

8. The combination of claim 7, wherein the separate snap element is chosen from a plurality of separate snap elements having different lengths.

9. The combination of claim 7, wherein the at least one second groove includes at least one undercut portion, and wherein the at least one second lug includes a retainer projecting laterally from the second lug into the undercut portion.

10. The combination of claim 9, wherein the at least one second lug includes a support surface for abutting against the assembly frame, and wherein the retainer and the support surface are positioned and/or dimensioned for applying substantially oppositely directed forces onto the assembly frame.

11. The combination of claim 7, wherein the window covering assembly frame includes second frame members; wherein the second frame member includes an area free of grooves adjacent the second groove, wherein the area free of grooves has a width that is larger than the second lug.

12. The combination of claim 7, wherein the separate snap element includes one first lug and two second lugs.

13. The combination of claim 12, wherein the two second lugs are laterally spaced apart.

14. The combination of claim 7, wherein the window frame and the assembly frame are free from direct contact.

15. The combination of claim 7, wherein the snap element is arranged for allowing the at least one first lug to deviate relative to the at least one second lug.

16. The combination of claim 7, wherein the window frame includes four first frame members of extruded profiles forming a substantially rectangular frame; wherein the window covering assembly frame includes four second frame members of extruded profiles forming a substantially rectangular frame; wherein the snap members mutually connect at least two first frame members with at least two second frame members.

17. The combination of claim 1,
wherein said one or more snap elements extend in a direction that is substantially orthogonal to a direction in which the screen and/or shade extends in its closed position.

18. The combination of claim 17, wherein the covering frame includes two opposed guides for guiding the at least one movable beam.

19. The combination of claim 17, wherein the one or more snap elements are lugs of the covering assembly arranged for cooperating with a groove of the window frame.

20. The combination of claim 19, wherein the one or more snap elements include a retainer projecting laterally from the snap element.

21. The combination of clam 17, wherein the one or more snap elements include a support surface for abutting against the window frame.

22. The combination of claim 20, wherein the one or more snap elements include a support surface for abutting against the window frame, and wherein the retainer and the support surface are positioned and/or dimensioned for applying substantially oppositely directed forces onto the window frame.

23. The combination of claim 17, wherein the covering assembly frame includes a second groove, wherein the covering assembly includes at least one separate snap element including at least one second lug for snapping connection to the second groove at least one first lug for snapping connection to the groove of the window frame.

24. The combination of claim 23, wherein the at least one second groove includes at least one undercut portion, and wherein the at least one second lug includes a retainer projecting laterally from the second lug into the undercut portion.

25. The combination of claim 23, wherein the at least one second lug includes a support surface for abutting against the window frame, and wherein the retainer and the support surface are positioned and/or dimensioned for applying substantially oppositely directed forces onto the assembly frame.

26. The combination of claim 23, wherein the window covering assembly frame includes second frame members; wherein the second frame member includes an area free of grooves adjacent the second groove, wherein the area free of grooves has a width that is larger than the second lug.

27. The combination of claim 23, wherein the separate snap element includes one first lug and two second lugs.

28. The combination of claim 27, wherein the two second lugs are laterally spaced apart.

29. The combination of claim 23, wherein the window frame and the assembly frame are free from direct contact.

30. The combination of claim 23, wherein the covering assembly includes four second frame members of extruded profiles forming a substantially rectangular frame; wherein the snap members mutually connect at least two second frame members with the window frame.

31. The combination of claim 17, wherein the screen and/or shade is a pleated screen and/or shade, or a roll-up screen and/or shade.

32. A method for connecting a window covering assembly to a window frame of a vehicle, the method comprising:

providing a window frame having an outer face, the outer face including at least one groove having a depth direction in a direction substantially orthogonal to a pane of the window frame;
providing a window covering assembly including:
an assembly frame;
a movable beam, movable with respect to the assembly frame;
a screen and/or shade connected to the movable beam, so as to be moved between an open and a closed position;
wherein the assembly frame is provided with one or more snap elements for snap-fixing the window covering assembly to the at least one groove of the window frame;
snap-fixing the window covering assembly to the window frame by pressing the one or more snap elements into the at least one groove in a direction substantially orthogonal to a pane of the window frame.

* * * * *